United States Patent [19]

Shinohara et al.

[11] Patent Number: 4,621,280
[45] Date of Patent: Nov. 4, 1986

[54] DIGITAL CHROMAKEY APPARATUS

[75] Inventors: Nobutaka Shinohara; Akihiro Minami; Shuji Hirakawa, all of Yokohama, Japan

[73] Assignee: Kabushiki Kaisha Toshiba, Japan

[21] Appl. No.: 712,244

[22] Filed: Mar. 15, 1985

[30] Foreign Application Priority Data

Mar. 15, 1984 [JP] Japan ................... 59-50015

[51] Int. Cl.⁴ ............................. H04N 9/75
[52] U.S. Cl. ...................... 358/22; 358/183
[58] Field of Search ................... 358/22, 183

[56] References Cited

U.S. PATENT DOCUMENTS 3,673,324  6/1972  Ito ........................... 358/22
3,778,542 12/1973  Hanseman ................. 358/22
4,041,527  8/1977  Rayner ..................... 358/22
4,319,266  3/1982  Bannister .................. 358/22
4,533,937  8/1985  Yamamoto ................. 358/22

OTHER PUBLICATIONS

"A Production Technique of a Television Program," pp. 128–133, Sectons 1 and 2, published by Nippon Hoso Kioki (1983).

Primary Examiner—Michael A. Masinick
Attorney, Agent, or Firm—Finnegan, Henderson, Farabow, Garrett & Dunner

[57] ABSTRACT

The digital chromakey system filters out a color signal from a first digital color-television signal and produces a chromakey signal which is combined with the first digital color-television signal to cancel out the color portion. The chromakey signal is also combined with a second color-television signal so that the second color television signal can be inserted into the first color-television signal whose color portion was cancelled.

7 Claims, 8 Drawing Figures

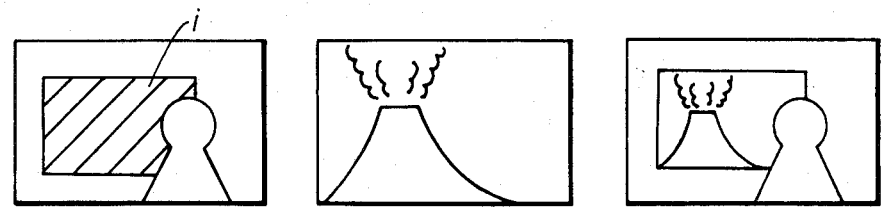
FIG. / A.   FIG. / B.   FIG. / C.
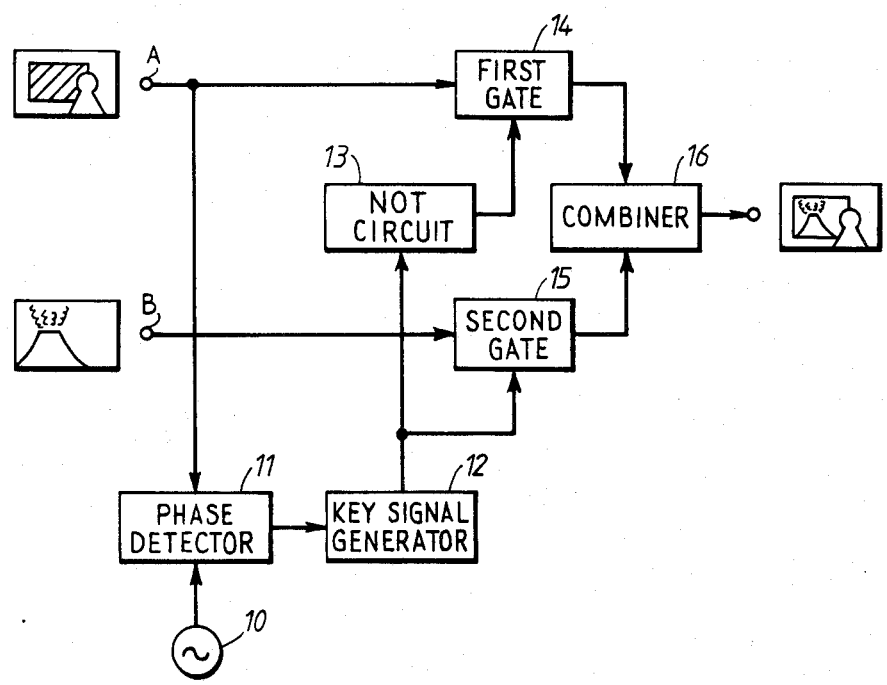
FIG. 2.
PRIOR ART

DIGITAL CHROMAKEY APPARATUS

BACKGROUND OF THE INVENTION

The present invention relates to a digital composite chromakey system for forming a composite television picture.

The chromakey system is used to insert one image into a predetermined color portion of another image frame. From the projected image shown in FIG. 1(a), more specifically, a key signal corresponding to a predetermined color component, e.g., color (i), is prepared and used to insert the projected image shown in FIG. 1(b) into the color component portion (i) in FIG. 1(a) to form the composite picture shown in FIG. 1(c)

When the composite picture frame is being formed by a chromakey system, the boundary of the two images combined with each other may change gradually from one image to the other one to provide a more natural composite effect. Such a manner of forming the composite image is called "soft chromakey."

A conventional analog chromakey system will now be described with reference to FIG. 2. The color-television signal of the projected image shown in FIG. 1(a) is supplied through terminal A to phase detector 11 and first gate 14. In phase detector 11, the phase of the color signal in the color-television signal is detected using a reference signal from a reference signal generator 10. The output of the phase detector is called the "phase detected signal" and is in a first state while the phase of the color signal corresponds to that of the reference signal.

The phase detected signal is supplied to a key signal generator 12 which generates a key signal while the phase detected signal is in the first state. This key signal corresponds to the predetermined color portion of the color television signal, for example the color blue.

The generated key signal is an input to NOT-circuit 13 and second gate circuit 15. The inverted key signal from NOT-circuit 13 is supplied to first gate 14 which, under the control of the inverted key signal, generates a video signal from which the blue component is removed. The video signal provided from the gate circuit 14 is supplied to a combiner 16.

The key signal from the key signal generator 12 also controls second gate 15 which receives the signal of the projected image shown in FIG. 1(b) from terminal B. As a result, a video signal to be inserted into the blue portion of the color television signal is supplied from gate 15 into combiner 16.

Combiner 16 merges the signals from second gate 15 and first gate 14 to generate the composite signal of the projected image of FIG. 1(c).

This chromakey system involves analog composite processing which unfortunately does not provide good chromakey efficiency because of insufficient color signal separation. Furthermore, in recent years video signals have been digitized to reduce signal deterioration. Without a digital chromakey system, the digitized video signal must be converted into an analog format before chromakey processing and then converted to the digital signal after the chromakey processing. Converting and reconverting requires several circuits and is very complicated.

An object of this invention is a digital chromakey system for image formation which processes a digitized composite signal digitally and thereby reduces the number and complexity of the chromakey circuitry and increases chromakey efficiency.

SUMMARY OF THE INVENTION

In accordance with the purposes of this invention and to achieve its objects and advantages, the digital chromakey system for combining a first digital color-television composite signal constituting a first picture frame and a second digital color-television composite signal constituting a second picture frame to be inverted into a desired portion of the first picture frame comprises: a digital filter for separating out a color signal component from the first digital color-television composite signal; means for generating a chromakey signal from the separated color signal and a reference color signal; means for generating a first weighted signal from the first digital color-television composite signal, the separated color component and the chromakey signal, the first weighted signal being weighted by the chromakey signal and substantially equivalent to the first digital color-television composite signal from which the color component has been removed; means for generating a second weighted signal from the second digital color-television composite signal and the chromakey signal, the second weighted signal being substantially equivalent to the second digital color-television composite signal; and adding means for adding the first and second weighted signals to generate a composite digital color-television composite signal in which the second picture frame is inserted into the first picture frame.

BRIEF DESCRIPTION OF THE DRAWINGS

FIG. 1 illustrates a chromakey formation;

FIG. 2 is a block diagram of the analog chromakey system;

DESCRIPTION OF THE PREFERRED EMBODIMENT

Figure 3:
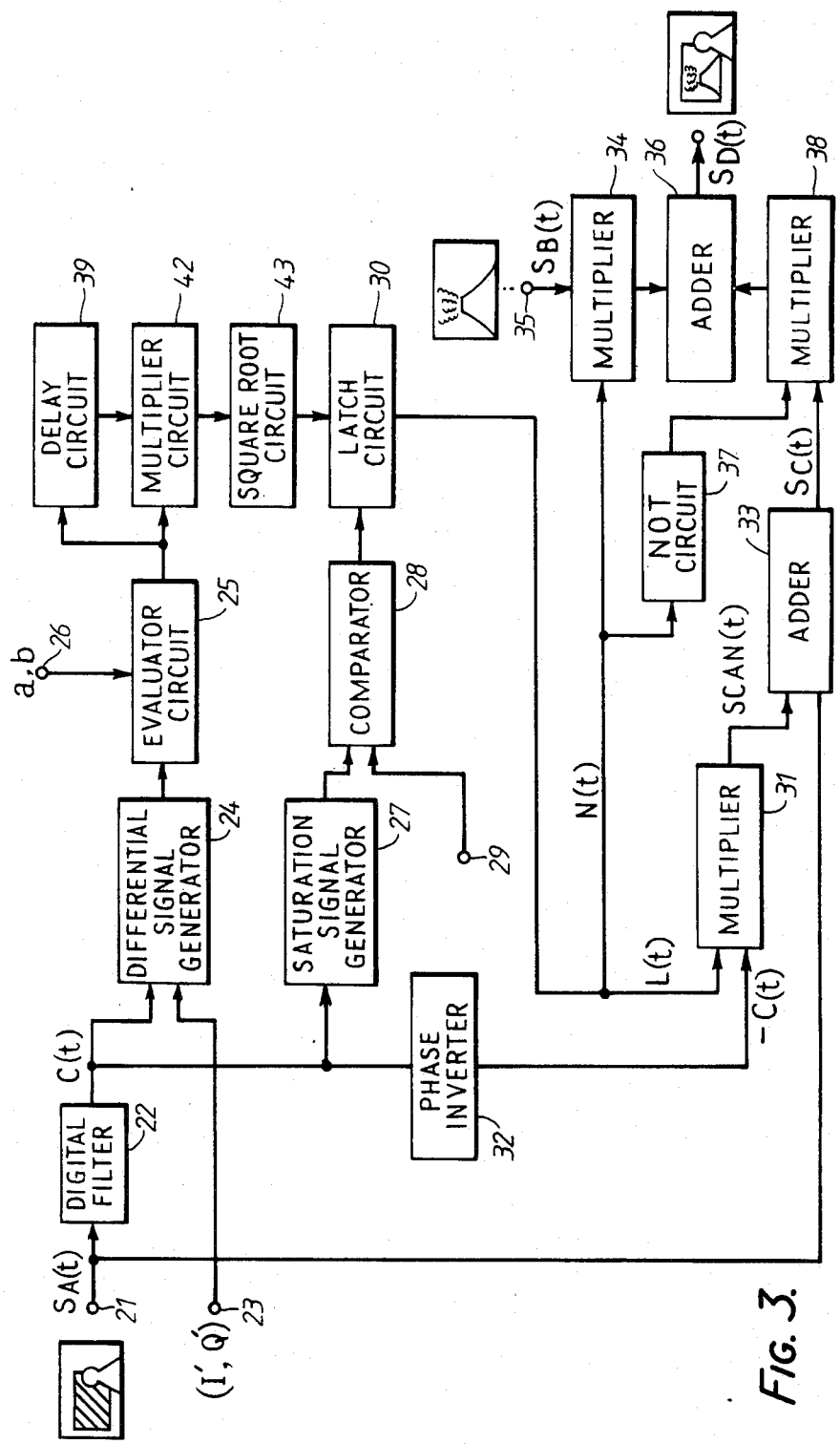
FIG. 3 is a block diagram of the digital chromakey system according to an embodiment of the present invention.

The present invention will be described in connection with the embodiment shown in FIG. 3.

A digitized television signal $S_A(t)$ (referred to hereinafter as "first digital color-television signal") of the NTSC system (which is one of the television systems) is applied to a first input terminal 21. $S_A(t)$ passes through digital filter 22, having a known design, which separates out a color signal C(t). The color signal C(t) is expressed by the following equation:

$$C(t) = S(t) \sin (2\pi f_{sc} \cdot t + \theta(t)) \quad (1)$$

$$= S(t) \sin \theta(t) \cos 2\pi f_{sc} \cdot t + S(t) \cos \theta(t) \sin 2\pi f_{sc} \cdot t$$

where:

S(t) is the saturation signal, $f_{sc}$ is the sub-carrier frequency of the saturation signal modulation, $\theta(t)$ is the color phase, and t equals i/fs where i is a positive integer and fs is the sampling frequency.

The sine component S(t) sin $\theta(t)$, and the cosine component S(t) cos $\theta(t)$ of the sub-carrier frequency fsc of Equation (1) can be replaced by I and Q where:

$$I = S(t) \cos \theta(t) \text{ and}$$

$$Q = S(t) \sin \theta(t) \quad (2)$$

If the sampling frequency fs equals 4fsc, the color signal C(t) sampled at fs appears in the following sequence during a four-sample period:

$$I, -Q, -I, Q, \ldots$$

The reference color signal (I', Q') which determines the color of the removed color signal C(t) is supplied through a second input terminal 23 to a differential signal generator 24 which determines the difference between the color signal (I, Q) separated by the digital filter 22 and the reference color signal (I', Q'). Differential signal generator 24 supplies a resultant differential signal to an evaluator circuit 25.

Evaluator circuit 25 standardizes the difference between the signals (I, Q) and (I', Q') using parameters a and b from third input terminal 26. The standardizing function f(x) is:

$$f(x) = \begin{cases} 0 & (|x| \geq a + b) \\ (a + b - |x|)/a & (b < |x| < a + b) \\ 1 & (b \leq |x|) \end{cases} \quad (3)$$

where:

$x = I - I'$ or $Q - Q'$, $a > 0$, and $b \leq 0$.

Figure 4:
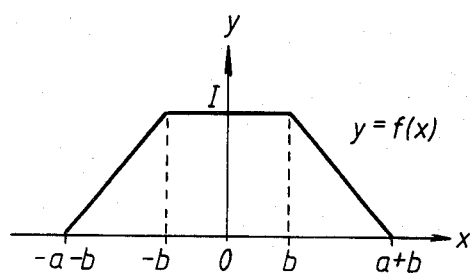
FIG. 4 is a graph of the characteristics of the function f(x) quantizing the degree of discrepancy between the color signal and the reference color.

The characteristics of the Equation (3) are depicted in FIG. 4.

The parameter a determines the softness of the composite image and the parameter b of the chromakey determines the color phase range of color filtered out. As parameter a increases, the softness increases and as parameter b increases, the color phase range of color filtered out widens.

Figure 5:
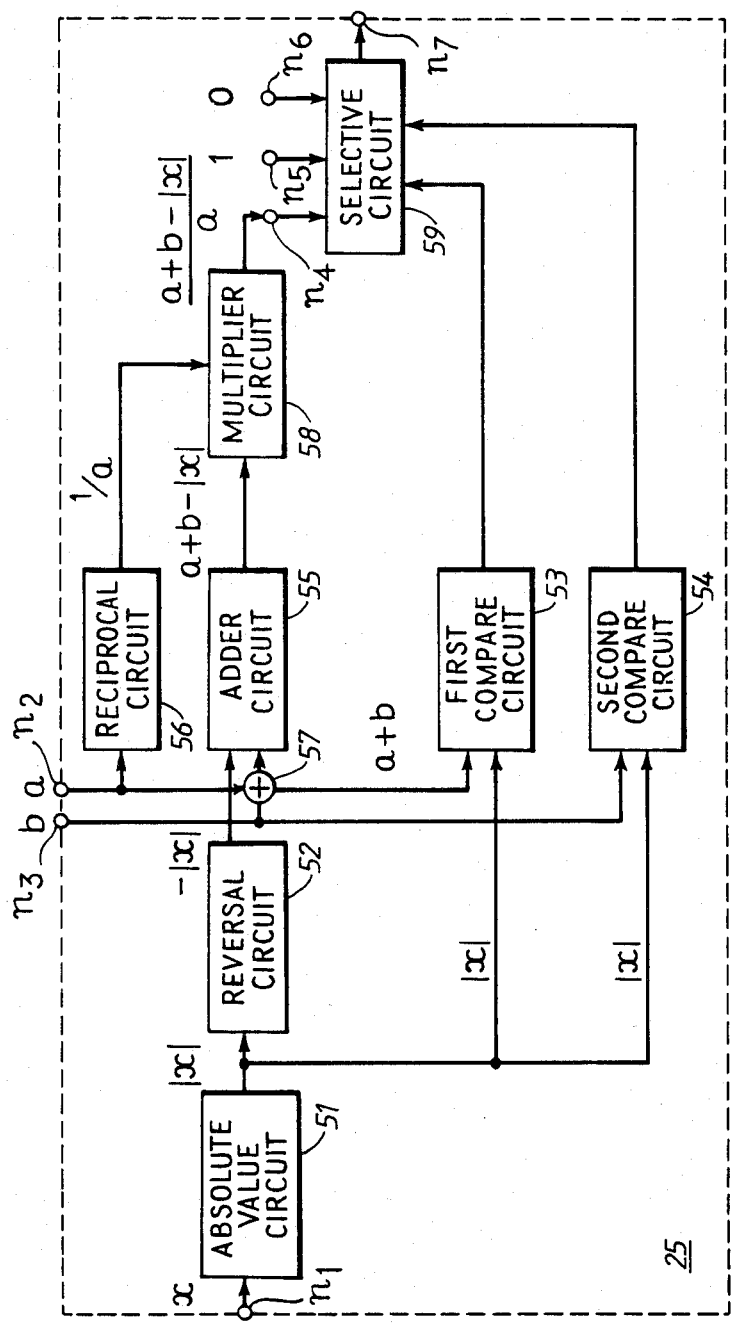
FIG. 5 is a block diagram of an evaluated circuit according to the present invention.

Evaluator circuit 25 is shown in greater detail in FIG. 5. Difference signal x from differential signal generator 24 is received at terminal $n_1$ and is applied to absolute value circuit 51 to generate an absolute signal $|x|$.

The absolute signal $|x|$ is applied to reversal circuit 52, first compare circuit 53 and second compare circuit 54. Reversal circuit 52 generates reversed signal $-|x|$ and applies it to adder circuit 55.

Parameters a and b are received at terminals $n_2$ and $n_3$, respectively. Parameter a is applied to reciprocal circuit 56 and adder 57 and parameter b is applied to adder 57 and second compare circuit 54. The reciprocated signal 1/a from circuit 56 is supplied to a multiplier circuit 58.

Adder 57 adds a with b to generate sum parameter a+b. The sum parameter signal is supplied to adder circuit 55 which adds that parameter to the reversed signal to produce a+b$-|x|$. Multiplier circuit 53 multiplies a+b$-|x|$ by 1/a and generates multiplied signal (a+b$-|x|$)/a which is then supplied to selective circuit 59 through terminal $n_4$.

Selective circuit 59 receives signals having the values 1 and 0 into terminals $n_5$ and $n_6$, respectively.

First compare circuit 53 compares the added parameter a+b with $|x|$ and second compare circuit 54 compares parameter b with $|x|$. The outputs from the first and second compare circuits are control signals for the selective circuit.

If the added parameter signal a+b is equal to or lower than the absolute signal $|x|$, selective circuit 59 outputs a level signal to terminal $n_7$. If $|x|$ is lower than the added parameter a+b and higher than the parameter b, selective circuit 54 outputs the signal (a+b$-|x|$)/a to terminal $n_7$. If the parameter b is equal to or higher than the absolute signal $|x|$, selective circuit 59 controls the output a level 1 signal to terminal $n_7$. As a result, evaluator circuit 25 generates f(x), known as the standardized signal, to delay circuit 39 and multiplier circuit 42.

Multiplier circuit 42 multiplies the standardized signals from evaluator circuit 25 and those same signals after they have passed through the delay circuit 39. The delay circuit 39 has a delay time equal to the sample period.

Square root circuit 43 takes the square root of the multiplier circuit 42 output and the result is expressed by the following equation:

$$G(I,Q, I',Q') = \sqrt{f(I - I') \times f(Q - Q')} \quad (4)$$

Figure 6:
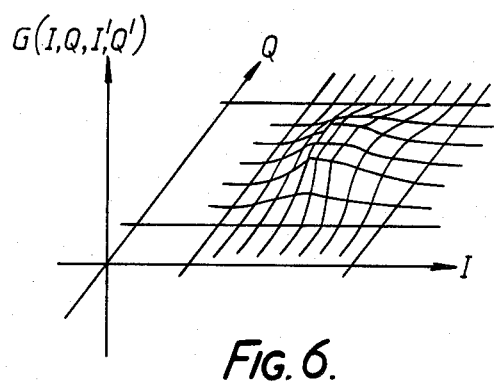
FIG. 6 is a graph of the characteristics of the evaluation function.

FIG. 6 shows the characteristic of this equation. The evaluation function G(I, Q, I', Q') is used as a chromakey signal for the chromakey processing.

The separated color signal C(t) from the digital filter 22 also feeds saturation signal generator 27 which generates a saturation signal $(=\sqrt{I^2+Q^2})$. This saturation signal is an input to comparator 28 which compares the saturation signal with a variable threshold value from fourth input terminal 29. If the saturation signal's level is below the variable threshold value, the output of square root circuit 43 is gated through latch circuit 30. Latch circuit 30 reduces to zero those parts of the chromakey signal output from square root circuit 43 when the saturation level is lower than the threshold value at terminal 29. As a result, the low-saturation portions (e.g., the black and white portions) are not subjected to the chromakey formation.

The formation of the desired composite image is done on the basis of the chromakey signal generated in the manner thus far described. In this case, a cancelling system is adopted as the chromakey formation system. This cancelling system is a system in which another image is inserted into that portion of the image from which the color component to be removed has been cancelled.

The chromakey signal output from the latch circuit 30 is divided into a key signal L(t) for the image formation and a formation key signal N(t). The color-cancelling key signal L(t) is one input to a multiplier 31 whose other input is the inverted color signal $-C(t)$ which has been inverted by a phase inverter 32. Signal $-C(t)$ is expressed by the following equation:

$$-C(t) = S(t) \sin (2\pi fsc \cdot t + \theta(t) + \pi) \quad (5)$$

-continued
$$= -I \sin 2\pi f_{sc} \cdot t - Q \cos 2\pi f_{sc} \cdot t$$

Multiplier 31 multiplies the inverted color signal −C(t) by the input signal L(t) to produce a color-cancelling key input Scan (t) which is expressed by the following equation:

$$\text{Scan }(t) = -L(t) \cdot C(t) \quad (6)$$

Adder 33 adds the color-cancelling key signal Scan (t) to first digital color-television signal $S_A(t)$ to generate signal Sc which provides the foreground image from which the blue color component is cancelled out. Sc(t) is expressed by the following equation:

$$S_C(t) = S_A(t) + \text{Scan}(t) \quad (7)$$

On the other hand, formation key signal N(t) is divided into two signals. One of which is an input of a multiplier 34 whose second input is second digital color-television signal $S_B(t)$, which provides the background image to be merged with the foreground image. Multiplier 34 multiplies N(t) and $S_B(t)$ and provides a video signal of the portion which is to be inserted. This output video signal is one input to adder 36.

N(t) also passes through NOT circuit 37 which converts it to an inverted signal (1−N(t)). This inverted signal (1−N(t)) is an input to multiplier 38 as is the signal SC(t) providing the foreground image. Multiplier 38 multiplies the two input signals together and the product is another input signal to adder 36.

Adder 36 adds the two input signals N(t)·SB(t) and (−1N(t))·S<sub>C</sub>(t) and provides a composite image signal $S_D(t)$ which has been combined with two images.

In detail, the signal S<sub>C</sub>(t) for the foreground image is multiplied by the inverted key signal (1−N(t)), and this is added to the signal $S_B(t)$ for the background image which is weighted by the formation key signal N(t). This addition is expressed by the following equation for digital chromakey forming the desired image:

$$S_D(t) = (1-N(t))S_C(t) + N(t) \cdot S_B(t) \quad (8)$$

In the embodiment thus far described, the description has been made on the assumption that the sampling frequency fs is four times the carrier frequency (+14.3 MH<sub>Z</sub>). However, the present invention can be applied to other sampling frequencies. If the frequency increases, the quality of image improves, but it also becomes difficult to build circuits.

What is claimed is:

1. A digital chromakey system for combining a first digital color-television composite signal representing a first picture frame and a second digital color-television composite signal representing a second picture frame to be inserted into a desired portion of said first picture frame, said system comprising:
   (a) a digital filter for separating out a color signal component from said first digital color television composite signal;
   (b) means coupled to said digital filter for generating a chromakey signal from said color signal component and a reference color signal;
   (c) means coupled to said digital filter and said chromakey signal generating means for generating a first weighted signal from said first digital color-television composite signal, said color component, and said chromakey signal, such that said first weighted signal is weighted according to said chromakey signal and is substantially equivalent to said first digital color-television composite signal without said color component;
   (d) means coupled to said chromakey signal generating means for generating a second weighted signal from said second digital color-television composite signal and said chromakey signal such that said second weighted signal is also weighted according to said chromakey signal and is substantially equivalent to said second digital color-television composite signal; and
   (e) means coupled to said first and second weighted signal generating means for adding said first and second weighted signals to generate a combined digital color-television composite signal representing an image having said second picture frame is inserted into said first picture frame.

2. The digital chromakey system as defined in claim 1 wherein said chromakey signal generating means includes:
   a differential signal generator receiving as inputs said color signal from said digital filter and said reference signal, said differential signal generator including means for comparing said color signal with said reference signal and for producing a differential signal;
   an evaluator circuit coupled to said differential signal generator and including means for standardizing said differential signal and outputting a standardized signal;
   a delay circuit coupled to said evaluator circuit for generating a delayed standardized signal;
   a multiplier circuit coupled to said evaluator circuit and said delay circuit generating a product signal representing the product of said standardized signal and said delayed standardized signal; and
   a square root circuit coupled to said multiplier circuit which forms a square root signal representing the square root of said product signal.

3. The digital chromakey system as defined in claim 1 wherein said chromakey signal generating means includes
   a threshold terminal for receiving a variable threshold value signal;
   means for generating a saturation signal from said color signal;
   a comparator coupled to said threshold terminal and said saturation signal generating means for comparing said saturation signal and said variable threshold value signal; and
   a latch circuit coupled to said comparator and including means for generating one level for said chromakey signal when said saturation signal level is lower than the level of said threshold value signal and another level otherwise.

4. The digital chromakey system as defined in claim 2 wherein said chromakey signal generating means includes:
   a threshold terminal for receiving a variable threshold value signal;
   means for generating a saturation threshold value signal from said color signal;
   a comparator coupled to said threshold terminal and said saturation signal generating means for comparing said saturation signal and said threshold value signal; and a latch circuit coupled to said comparator and including means for generating one level for said chromakey signal when said saturation signal level is lower than the level of said threshold value signal and another signal otherwise.

5. The digital chromakey system as defined in claim 2 wherein said evaluator circuit includes:
   parameter terminals for receiving parameter signals;
   comparing means coupled to said parameter terminals for comparing said differential signal with said parameter signals and for generating comparison outputs; and
   means coupled to said comparing means for standardizing said differential signal according to said outputs from said comparing means.

6. The digital chromakey system as defined in claim 1 wherein said first weighted signal generating means includes:
   a first multiplier for multiplying said color signal by said chromakey signal to produce a color-cancelling key signal;
   an adder coupled to said multiplier for adding said color-cancelling key signal to said first digital color-television signal and for producing a sum signal;
   a NOT circuit coupled to said chromakey signal generating means for generating an inverted chromakey signal; and
   a second multiplier for multiplying said sum signal and said inverted chromakey signal.

7. A method of combining a first digital color-television composite signal representing a first picture frame with a second digital color-television composite signal representing a second picture frame to be inserted into a desired portion of said first picture frame, said method comprising the steps of:
   (a) separating out a color signal component from said first digital composite signal;
   (b) generating a chromakey signal from said color signal component and from a reference signal;
   (c) generating a first weighted signal weighted according to said chromakey signal and substantially equivalent to said first digital composite signal without said color component;
   (d) generating a second weighted signal weighted according to said chromakey signal and substantially equivalent to said second digital composite signal; and
   (e) combining said first and second weighted signals to form a combined composite signal.

* * * * *